United States Patent [19]
Jackson et al.

[11] 3,765,758
[45] Oct. 16, 1973

[54] MICRO-IMAGE VIEWER-PRINTER MACHINE OPTICAL ASSEMBLY

[75] Inventors: Richard W. Jackson, Barrington; John J. Schulze, Prospect Heights, both of Ill.

[73] Assignee: Addressograph-Multigraph Corporation, Mount Prospect, Ill.

[22] Filed: May 5, 1972

[21] Appl. No.: 250,615

[52] U.S. Cl. .......................... 355/5, 353/94, 355/44, 355/70
[51] Int. Cl. ............................................ G03b 27/76
[58] Field of Search ..................... 355/5, 44, 45, 66, 355/70, 71; 353/94; 95/11 EM

[56] References Cited
UNITED STATES PATENTS

| | | | |
|---|---|---|---|
| 2,979,026 | 4/1961 | Reuter | 355/5 X |
| 3,217,622 | 11/1965 | Kiyono | 95/11 EM |
| 3,586,437 | 6/1971 | Dietz | 355/64 X |
| 3,507,590 | 4/1970 | Cerasni | 355/44 X |
| 2,649,018 | 8/1953 | Schnetzer | 355/71 X |
| 3,601,486 | 8/1971 | Levine | 355/45 |

Primary Examiner—Joseph F. Peters, Jr.
Assistant Examiner—Michael Harris
Attorney—Richard D. Mason et al.

[57] ABSTRACT

A micro-image viewer-printer machine for selectively viewing or reproducing micro-images, particularly those stored on a roll of microfilm, includes a viewing screen for observing projected images from a roll of microfilm and a printing assembly for automatically, rapidly reproducing copies of the images from the roll of microfilm. An optical assembly includes two independent radiation sources, the first source providing illumination to project a micro-image to a viewing screen and the second source providing illumination to project a micro-image to expose sheets of copy material. The two radiation sources are focused at the same focal point and utilize the same optical path through a condenser lens assembly to simulate a single point source of radiation. The optical assembly further includes a shutter assembly to prevent the preexposure or overexposure of sheets of copy material and a mirror assembly to selectively reflect a projected image to the viewing screen or to pass the projected image to a printing assembly of the present machine.

17 Claims, 13 Drawing Figures

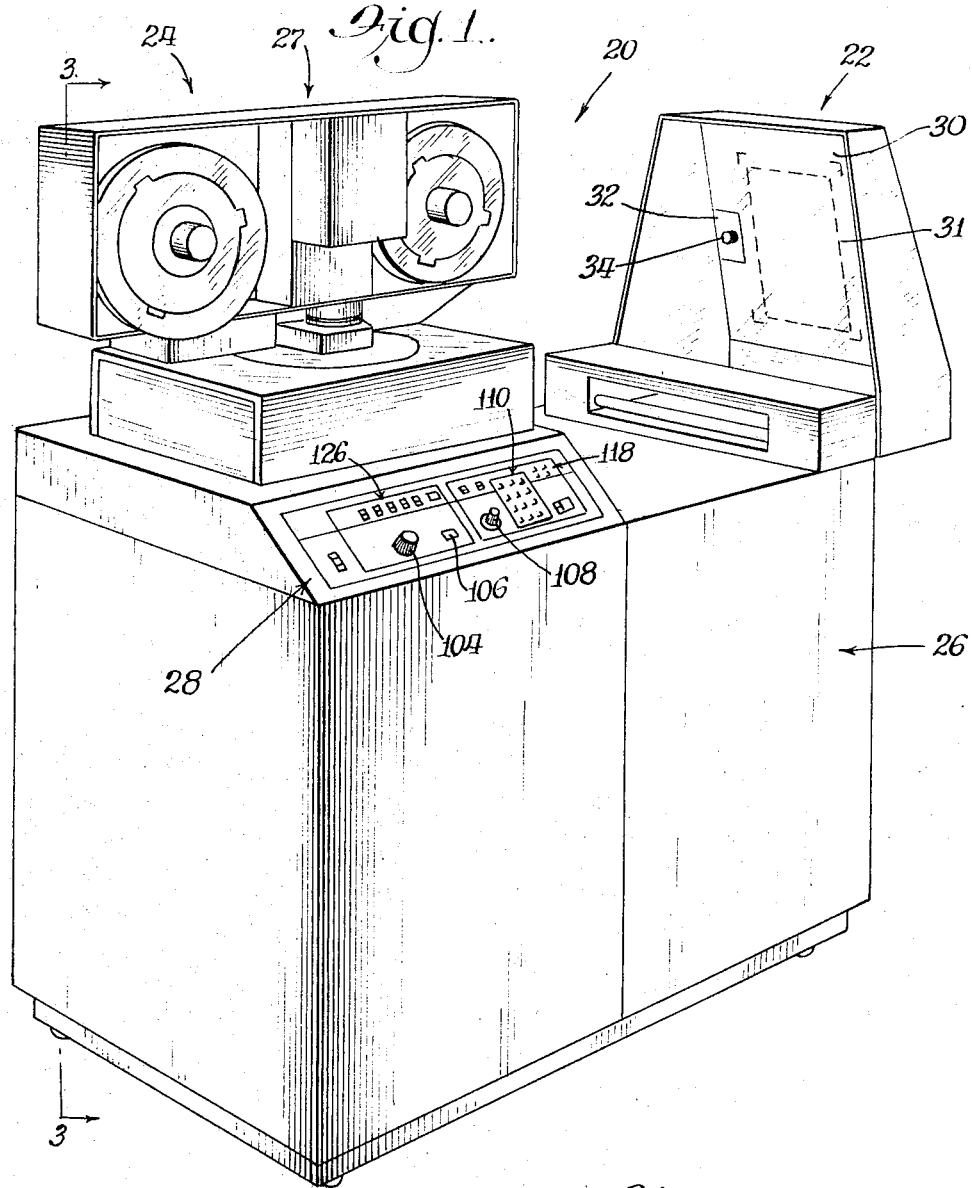
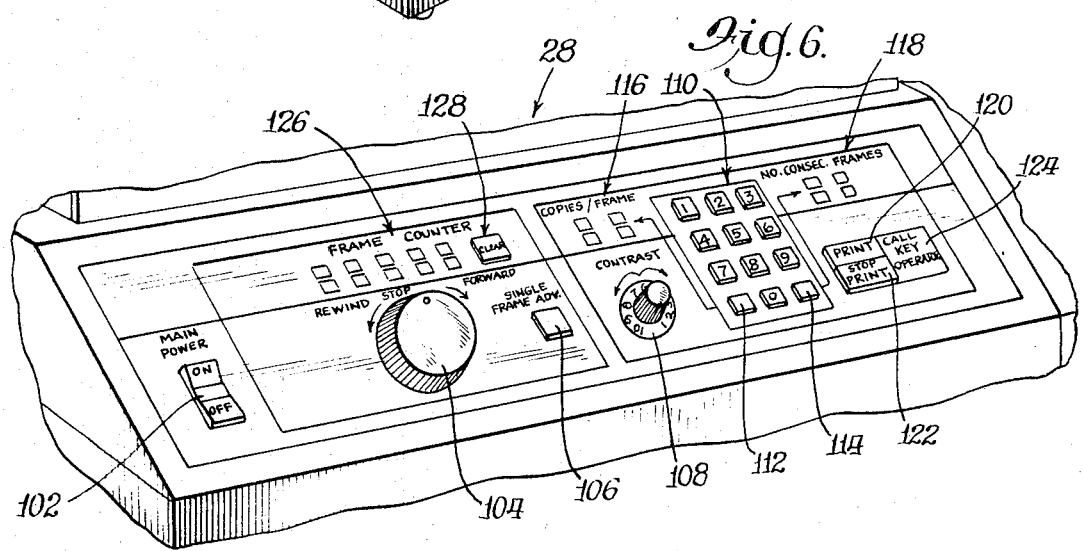

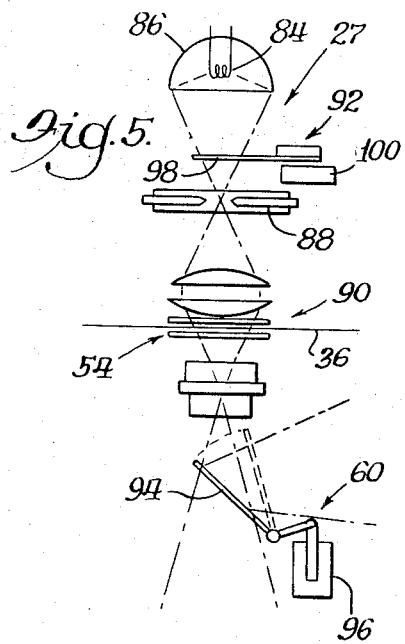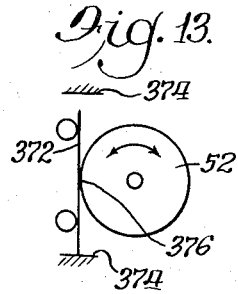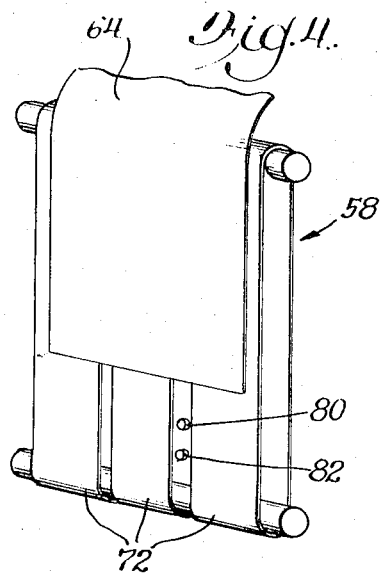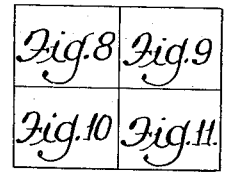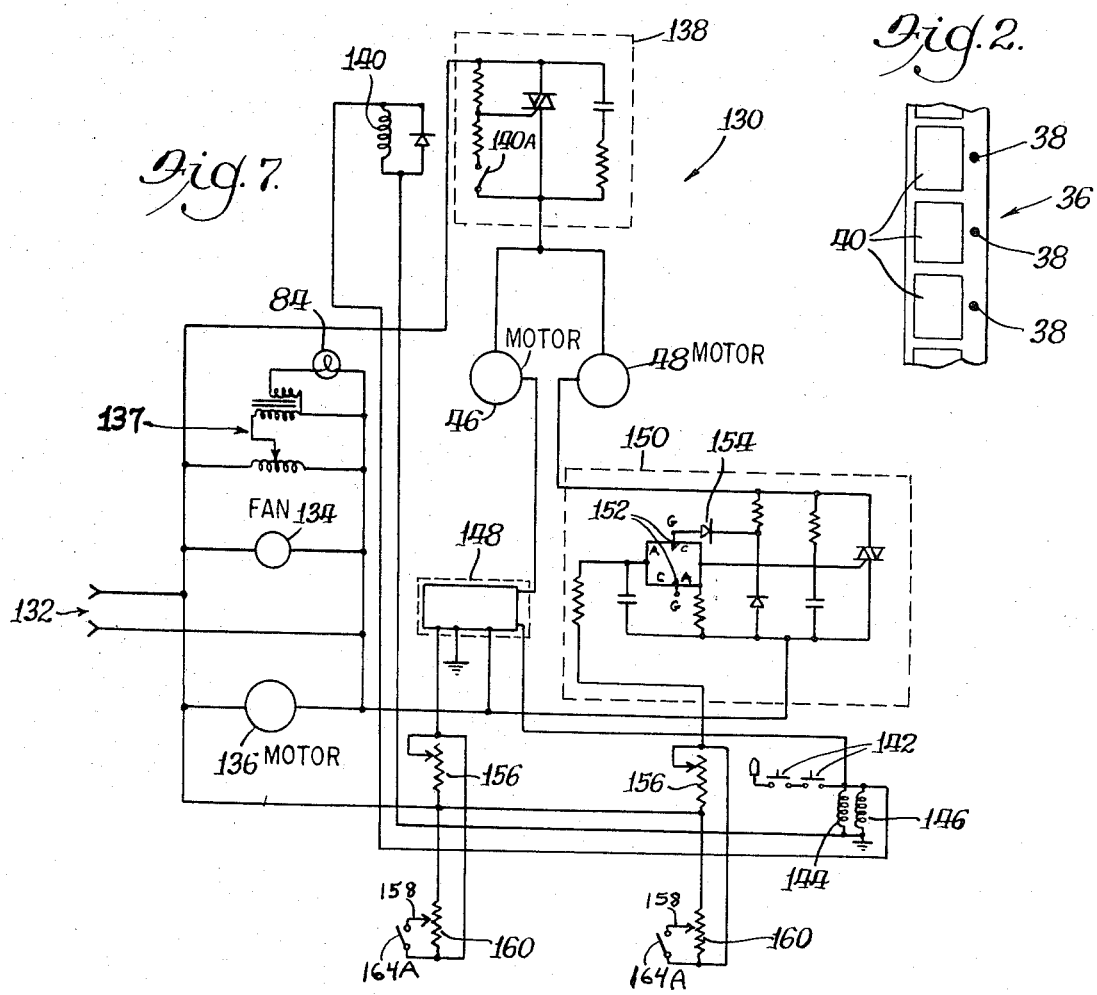

MICRO-IMAGE VIEWER-PRINTER MACHINE OPTICAL ASSEMBLY

BACKGROUND OF THE INVENTION

1. Field of the Invention

The invention relates generally to a device for viewing and reproducing micro-images and, more particularly, to an improved optical assembly to operate in conjunction with high speed printing or reproduction apparatus.

2. Description of the Prior Art

Information storage in the form of micro-images on a roll of microfilm or on microfiche cards has become quite commonplace. Filing space is drastically reduced with the storage of information in this manner. However, the storage of information in this manner is only acceptable if the information stored is quickly and easily retrievable. The information stored should be capable of being retrieved by the projection of the micro-images onto a viewing screen for viewing and study and, in many cases, by the reproduction of enlarged paper copies of the micro-images.

It has been known to combine both the capability for viewing micro-images and the capability for reproducing paper copies of micro-images into a single machine. However, the prior art machines are, for the most part, unacceptable in that they require an inordinate length of time to complete the steps of selection, viewing and printing of the micro-images. The prior art machines were further deficient due to their complexity in utilizing two independent radiation sources having independent optical paths, one of the radiation sources providing the illumination for the selection and viewing function of the machine and the other radiation source providing the illumination for the reproduction function of the machine. The prior art machines also suffer from the deficiency of being relatively slow in reproducing paper copies of the stored micro-images and, thus, detract from the attractiveness of storing information in micro-image form.

SUMMARY OF THE INVENTION

An object of the present invention is to provide a new and improved device for viewing and reproducing information stored in micro-image form.

Another object of the present invention is to provide a new and improved device for viewing and reproducing information stored in micro-image form capable of the high speed selection and presentation of micro-images for viewing on a viewing screen.

Another object of the present invention is to provide a new and improved device for viewing and reproducing information stored in micro-image form capable of performing its reproduction function in a high speed mode of operation.

Another object of the present invention is to provide a new and improved optical system for a device for viewing and reproducing information stored in micro-image form.

Another object of the present invention is to provide a new and improved optical system for a device for viewing and reproducing information stored in micro-image form having plural radiation sources focused at a single point and sharing a common radiation path for simulating a single point source of radiation.

Another object of the present invention is to provide a new and improved optical system for a device for viewing and reproducing information stored in micro-image form having plural radiation sources and a shutter mechanism for controlling the passage of radiation from one of the plural radiation sources during the various operations of the device of the present invention.

Another object of the present invention is to provide a new and improved optical system for a device for viewing and reproducing information stored in micro-image form having a mirror assembly for selectively passing the projection of a micro-image to a viewing screen or for passing the projection of a micro-image to the reproduction components of the present invention.

Briefly, the device of the present invention comprises a micro-image viewer-printer machine for selectively viewing or reproducing micro-images, particularly those stored on a roll of microfilm, without the deficiencies exhibited by the prior art devices discussed above. The device of the present invention includes a transport assembly for moving the microfilm through the machine in either a slow or a rapid mode of operation. The device of the present invention further includes a viewing screen for viewing projected images from a roll of microfilm and a printing assembly for automatically reproducing copies of the images from the roll of microfilm. A novel optical assembly is provided that utilizes two independent radiation sources, the first source providing the illumination to project an image to a viewing screen of the device of the present invention and the second source providing the illumination to expose sheets of copy material to a projected image from the roll of microfilm. The two radiation sources are focused at the same focal point and utilize the same optical path through a condenser lens assembly to simulate a single point source of radiation.

The first radiation source is energized during the entire operation of the device of the present invention; whereas the second radiation source is energized only for a brief period to expose each copy sheet to an image from the roll of microfilm. A shutter assembly is provided to block the emitted radiation from the first radiation source during the printing operation of the device of the present invention. A movable mirror assembly is provided to selectively reflect a projected micro-image to the viewing screen or to pass the projection of a micro-image to the reproduction components of the device of the present invention.

BRIEF DESCRIPTION OF THE DRAWINGS

The above and other objects and advantages and novel features of the present invention will appear from the following detailed description of a preferred embodiment of the invention illustrated in the accompanying drawings wherein:

FIG. 1 is a front, perspective view of a micro-image viewer-printer machine constructed in accordance with the principles of the present invention;

FIG. 2 is a fragmentary plan view of a portion of a preferred type of microfilm to be used with the device of the present invention;

FIG. 4 is a fragmentary perspective view of an exposure station contained within the printing or reproduction assembly of the device of the present invention;

FIG. 5 is a diagrammatic view of a preferred embodiment of the optics assembly constructed in accordance with the principles of the present invention;

FIG. 6 is a detailed, fragmentary view of a preferred embodiment of the control panel of the device of the present invention;

FIG. 7 illustrates a preferred embodiment of a logic circuit for controlling the operation of the various motors of the device of the present invention;

FIG. 12 illustrates in a diagrammatic form the manner in which FIGS. 8 through 11 should be assembled to illustrate the control circuit of the device of the present invention; and FIG. 13 illustrates in diagrammatic form a preferred embodiment of a device for sensing the direction of movement of microfilm through the device of the present invention.

DESCRIPTION OF THE PREFERRED EMBODIMENTS

General

Figure 3:
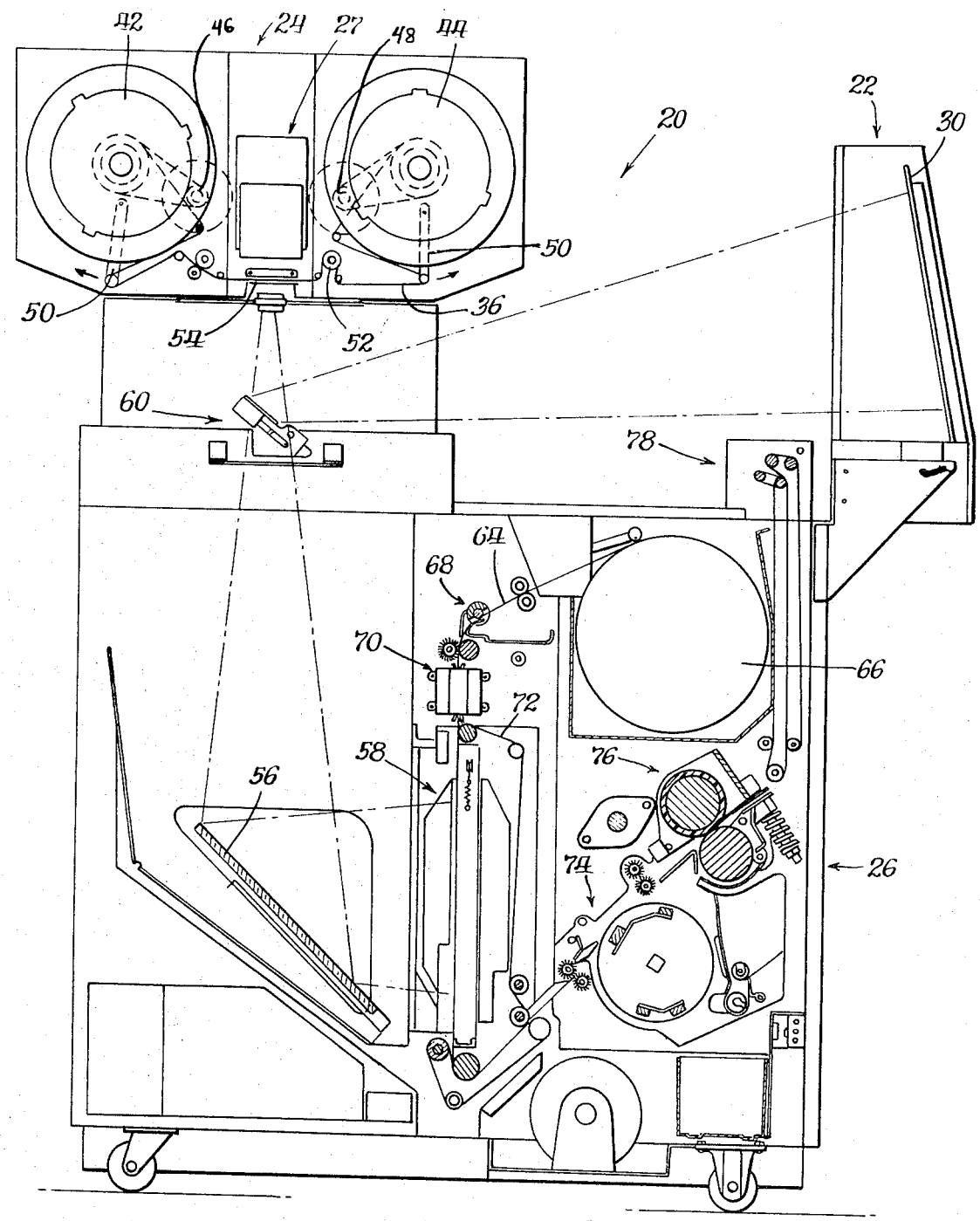
FIG. 3 is a sectional view of the device of the present invention taken along line 3—3 of FIG. 1.

Referring to the drawings and initially to FIGS. 1 and 2, there is illustrated a new and improved micro-image or microfilm viewer-printer machine, generally designated as 20, constructed in accordance with the principles of the present invention. The microfilm viewer-printer machine 20 of the instant invention is capable of automatically reproducing a multiple number of copies of a multiple number of consecutive frames from a roll of microfilm. The machine 20 also provides a numerical counting function by counting each frame on the roll of microfilm as it passes through the machine. This establishes a reference number for each frame on the roll of microfilm. The machine 20 both permits the enlarged viewing of images from the roll of microfilm and the rapid reproduction of those images.

In accordance with an important advantage of the present invention, the microfilm machine 20 includes a viewing assembly 22, a transport assembly 24, a printing or reproduction assembly 26, an optics assembly 27 and a control panel 28.

Viewing Assembly

The viewing assembly 22 includes a viewing screen 30 that enables each image 31 on a roll of microfilm to be centered, focused and viewed by an operator. A cutout portion 32 in the plane of the viewing screen 30 is provided for positioning therein an optical sensor 34. The optical sensor 34 is manually movable within the cutout portion 32 to permit the images 31 on a roll of microfilm to be accurately centered on the viewing screen 30. The optical sensor 34 responds to indicia corresponding to each frame on a roll of microfilm to thereby stop the movement of the roll of microfilm resulting in an image 31 from the roll of microfilm being accurately centered on the viewing screen 30. The optical sensor 34 also provides a pulse to a frame counter to thereby provide a reference indication for the particular frame at that movement being viewed or reproduced by the machine 20.

Various different types of microfilm may be used in accordance with the principles of the instant invention. A preferred type of microfilm to be used with the machine 20 is illustrated in FIG. 2. A strip of microfilm 36 preferably includes a reference mark or indicia corresponding to each frame 40 on the roll of microfilm. The reference indicia 38 is preferably a darkened area on positive microfilm and a transparent or translucent area on negative microfilm immediately adjacent each frame 40 on the roll of microfilm. The reference indicia 38 is sensed by the optical sensor 34 (FIG. 1) to stop the movement of the microfilm through the machine 20 to thereby accurately center each image 31 from the roll of microfilm on the viewing screen 30.

The machine 20 may also be used with perforated microfilm without the reference indicia 38 (FIG. 2) where the microfilm has a constant number of perforations between each frame on the roll of microfilm. The optical sensor 34 is used in this case to sense each perforation and to provide a signal to a counter of the type that will provide a output pulse for a specific number of input pulses. The output pulse from the counter is then used to pulse a frame counter and to stop the movement of microfilm through the machine 20 to thereby center each image 31 on the viewing screen 30.

Unperforated microfilm without the reference indicia 38 may also be used by the machine 20. In this case, a time delay is used to advance the microfilm from frame to frame. The time delay is set to a specific amount with a very small percentage of repeat error. This repeat error is cumulative, however, and builds up until it causes the images 31 from the roll of microfilm to drift out of registration. This drift may be observed by the operator of the machine 20 by watching the momentary flash of each image 31 on the viewing screen 30. A control may be provided to permit the operator to then increase or decrease the time delay for one or more images until registration or accurate centering of the images is achieved. The time delay for this type of film is thus used in place of the optical sensor 34 to provide counting pulses to a frame counter and to stop the movement of microfilm through the machine 20.

Transport Assembly

The transport assembly 24 is best illustrated in FIG. 3 and includes a load reel 42 of microfilm and a take-up reel 44. The load reel 42 contains a supply of microfilm to be viewed or copied by the machine 20 and the take-up reel 44 is used to store the microfilm as it passes through the machine 20. A motor 46 is provided for the reel 42 and a motor 48 is provided for the reel 44. The motors 46 and 48 are normally driven at the same speed in opposition to each other during the operation of the machine 20. This results in applying tension but no movement to the microfilm strip 36. A control to be further described hereinafter is also provided to selectively increase the speed of either the motor 46 or the motor 48 to thereby either rewind or advance the microfilm strip 36 is a rapid scan mode of operation.

A pair of movable, spring-biased tension arms 50 are provided for controlling a set of brakes for the motors 46 and 48. The tension arms 50 are movable against the bias of their return springs to the positions illustrated in FIG. 3 when in engagement with the tensioned microfilm strip 36. In the positions illustrated, the tension arms 50 maintain the brakes for the motors 46 and 48 in a disengaged condition. As soon as the tension arms 50 become disengaged from the film strip 36, both brakes for the motors 46 and 48 are engaged The transport assembly 24 further includes a capstan drive shaft 52 for advancing the microfilm 36 in a slow scan mode of operation and a film hold-down assembly 54 formed of a pair of opposed, movable, flat glass plates controlled by a solenoid for maintaining the microfilm strip 36 in a planar, stationary condition for viewing or reproduction by the machine 20. In its normal condition, the film hold-down assembly 54 is in secure engagement with the microfilm strip 36. When the microfilm strip 36 is being moved through the machine 20, a solenoid is energized to separate the opposed, flat glass plates and thereby disengage the hold-down assembly 54 from the microfilm strip 36.

Printing Assembly

The printing or reproduction assembly 26 of the machine 20 is essentially the same as that fully disclosed and described in the copending application of Charles L. Turner and Arthur S. Zerfahs, Ser. No. 889,630, assigned to the same assignee as the instant invention.

Briefly, the printing assembly 26 includes a reflective surface 56 for passing a projected image from the microfilm strip 36 to an exposure station 58. A movable mirror assembly 60 is used to selectively reflect an image from the microfilm strip 36 projected by an optics assembly 27 to the viewing screen 30 or to pass the projected image to the reflective surface 56 for presentation to the exposure station 58. Copy material 64 is passed from a supply roll 66 through a cutter station and a corona charging station 70. After receiving a high voltage charge at the charging station 70, the copy material 64 passes to the exposure station 58 where it is exposed and from there to a developer station 74 and a fuser station 76 which develop and fuse a visible reproduction of the projected image from the microfilm strip 36 onto the sheet of copy material 64. After leaving the fuser station 76, the sheet of copy material 64 is transported to the exit station 78.

The exposure station 58 (FIG. 4) preferably includes a plurality of endless belts 72 for transporting a sheet of copy material 64. The exposure station 58 further includes a shutter and mirror control sensor 80 and an exposure sensor 82 for controlling the exposure of a sheet of copy material 64 by a projected image from the strip of microfilm 36. The shutter and mirror control sensor first detects the leading edge of a sheet of copy material 64 and causes a mirror in the mirror assembly 60 to move out of the path of the projected image from the strip of microfilm 36 and, thus, to pass the image to the reflective surface 56. The control sensor 80 also causes a shutter, to be more fully described hereinafter, to block the light emitted by a viewing lamp, also described hereinafter. When the leading edge of a sheet of copy material 64 is subsequently detected by the exposure sensor 82, the sheet of copy material 64 is caused to be exposed to an image on the strip of microfilm 36. After a predetermined delay, the mirror of the mirror assembly 60 returns to its normal blocking position (FIG. 3) and the shutter is moved out of the path of the light from the viewing lamp.

Optics Assembly

In accordance with an important feature of the present invention, the microfilm viewer-printer machine 20 includes an optics assembly 27 having plural radiant energy sources for emitting radiation along a common path. The plural radiation sources are positioned such that their emitted radiation is focused at the same predetermined focal point so as to simulate a single point source of radiation in order that the emitted radiation may pass correctly through a condenser lens assembly and to equally illuminate an image field.

As illustrated in FIG. 5, the optics assembly 27 of the present invention includes a viewing lamp 84 with an associated reflector 86 mounted above and in line with a xenon arc exposure lamp 88 and a condenser lens assembly 90. The reflector 86 focuses the illumination from the viewing lamp 84 at the focal point of the xenon arc exposure lamp 88. The position of the exposure lamp 88 above the condenser lens assembly 90 is chosen so as to fill the condensers of the condenser lens assembly 90 with illumination to thereby fully and equally illuminate an image field. The viewing lamp 84 is continuously energized during the whole operation of the microfilm machine 20 and provides illumination for viewing a projected image on the viewing screen 30 (FIG. 3). The exposure lamp 88 (FIG. 5) is used to provide a short, high energy pulse of light for exposing each sheet of copy material 64 (FIG. 3) in making reproductions of images from the microfilm strip 36.

During the viewing operation of the machine 20, a reflective surface 94 of the mirror assembly 60 is in its atrest position (FIG. 5), totally reflecting a projected image as illuminated by the viewing lamp 84 to the viewing screen 30 (FIG. 3). During the printing or reproduction operation of the microfilm machine 20, a mirror control solenoid 96 (FIG. 5) is energized to move the reflective surface 94 to the position illustrated by the dotted lines. In this position, the reflective surface 94 is completely removed from the path of the projected image from the microfilm strip 36 (FIG. 3). In order to prevent the copy material 64 from being pre-exposed or over-exposed by the illumination from the viewing lamp 84 (FIG. 5), a shutter assembly 92 is provided. In its normal position, a shutter 98 of the shutter assembly 92 is completely out of the path of the emitted light from the viewing lamp 84. When a shutter control solenoid 100 is energized, simultaneously with the energization of the mirror control solenoid 96, the shutter 98 is moved into the path of the illumination from the viewing lamp 84 before the reflective surface begins to move from its at-rest position so as to completely block all the light from the viewing lamp 84. Thus, only a short, high energy burst of light from the exposure lamp 88 is permitted to pass to the exposure station 88 (FIG. 3) to completely expose the sheet of copy material 64.

Control Panel

The control panel 28 for the microfilm machine 20 includes a main power on-off switch 102 for supplying alternating current power to the various internal circuits of the microfilm machine 20. A rapid scan control switch 104 is provided for transporting the microfilm through the machine 20 in a rapid scan mode. The control switch 104 in its STOP position supplies an equal current to the reel motors 46 and 48 (FIG. 3) to drive the motors 46 and 48 at the same speed, thereby maintaining the film strip 36 stationary and under tension. When the control switch 104 is moved from its STOP position to its FORWARD position, more current is supplied to the motor 48 than is supplied to the motor 46 to increase the speed of the motor 48, thereby advancing the microfilm strip 36 through the machine 20 in a rapid mode. The control switch 104 may be variously positioned by an operator so as to regulate the forward speed of the motor 48. In its REWIND position, the control switch 104 supplies more current to the motor 46 than to the motor 48 to thereby move the microfilm 36 through the machine 20 in a reverse or rewind direction in a rapid mode. Again, the rewind speed of the motor 46 may be regulated by an operator by varying the position of the control switch 104.

A SINGLE FRAME ADVANCE button 106 (FIG. 6) is provided to advance the microfilm strip 36 (FIG. 3) in a forward direction, one frame at a time, for each depression of the button 106 (FIG. 6). A CONTRAST control 108 is provided to enable an operator to set the illumination of the exposure lamp 88 (FIG. 5) at a desired level. A keyboard encoder 110 (FIG. 6) is provided to enable an operator to enter into the microfilm machine 20 the number of copies to be made per frame of the microfilm strip 36 (FIG. 3) and the number of consecutive frames of the microfilm strip 36 to be copied. These numbers may be entered by depressing either a STROBE button 112 (FIG. 6) for the number of copies per frame or a STROBE button 114 for the number of consecutive frames to be copied. After these numbers are entered, a COPIES PER FRAME indicator 116 and a NUMBER OF CONSECUTIVE FRAMES indicator 118 provide a visual display of the respective numbers.

A PRINT button 120 is provided to initiate the printing or reproduction cycle of the machine 20. A STOP-PRINT button 122 is provided to interrupt the printing cycle of the machine 20. A CALL KEY OPERATOR indicator light 124 is provided to indicate a malfunction during the operation of the machine 20.

A FRAME COUNTER indicator 126 is provided to indicate the consecutive number of the frame of the microfilm strip 36 (FIG. 3) at that moment being viewed or reproduced by the machine 20. A CLEAR button 128 (FIG. 6) is provided to reset the FRAME COUNTER indicator 126 to 0.

Control Circuitry

1. General: The circuit for controlling the operation of the microfilm viewer-printer machine 20 is illustrated in FIGS. 7 through 11. In order to fully appreciate the logical operation of the circuit of FIGS. 8 through 11, these Figures should by physically assembled as illustrated in FIG. 12.

Figure 8:
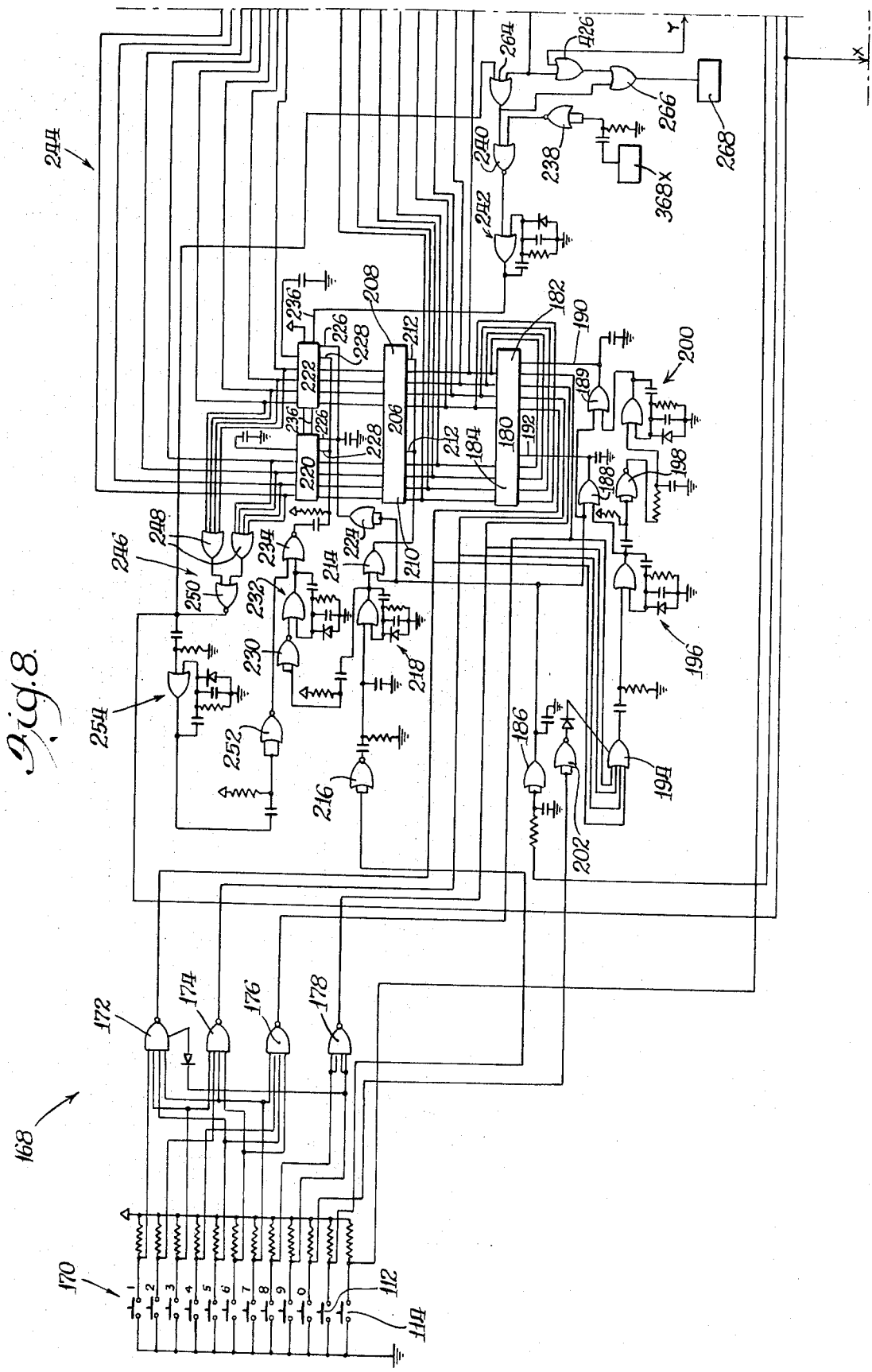
FIG. 8 illustrates a preferred embodiment of a logic circuit for controlling the programming of information into the device of the present invention and for controlling the operation of the device of the present invention to automatically reproduce a variable, preselectable number of copies of an image on a roll of microfilm.
Figure 9:
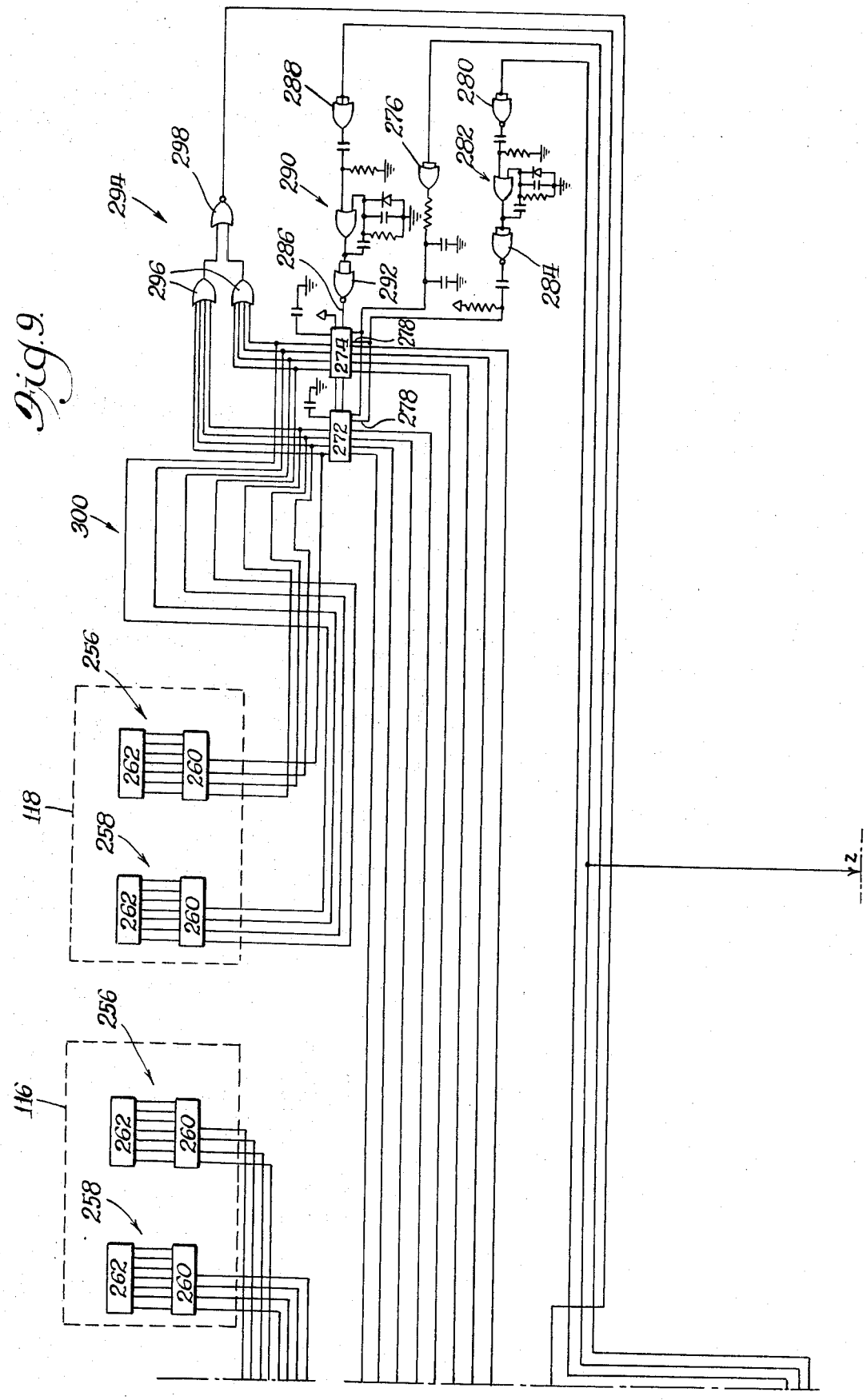
FIG. 9 illustrates a preferred embodiment of a logic circuit for controlling the operation of the device of the present invention to automatically reproduce a variable, preselectable number of copies of a variable, preselectable number of consecutive frames on a roll of microfilm.
Figure 10:
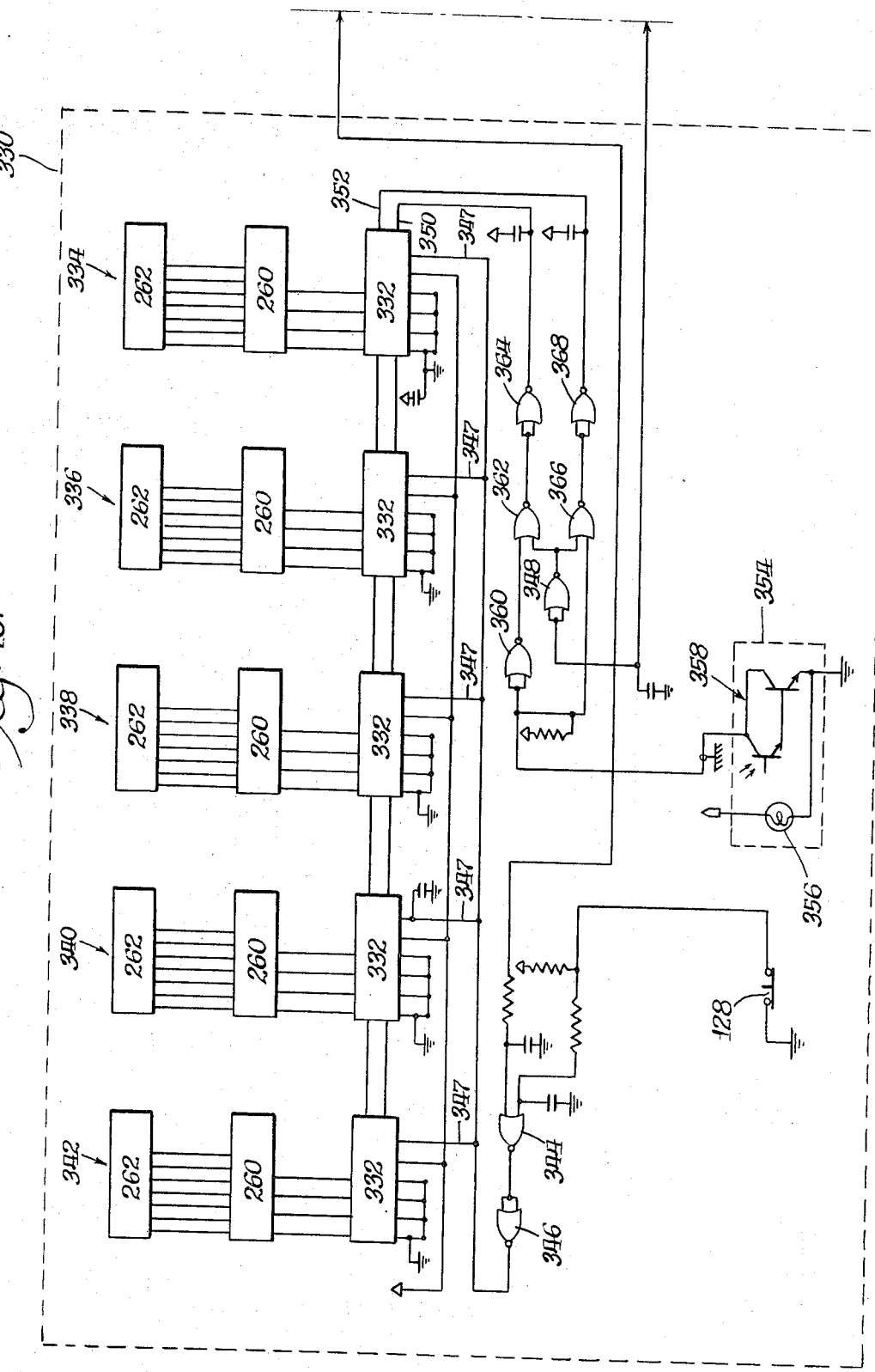
FIG. 10 illustrates a preferred embodiment of a logic circuit for a reference frame counter constructed in accordance with the principles of the present invention.
Figure 11:
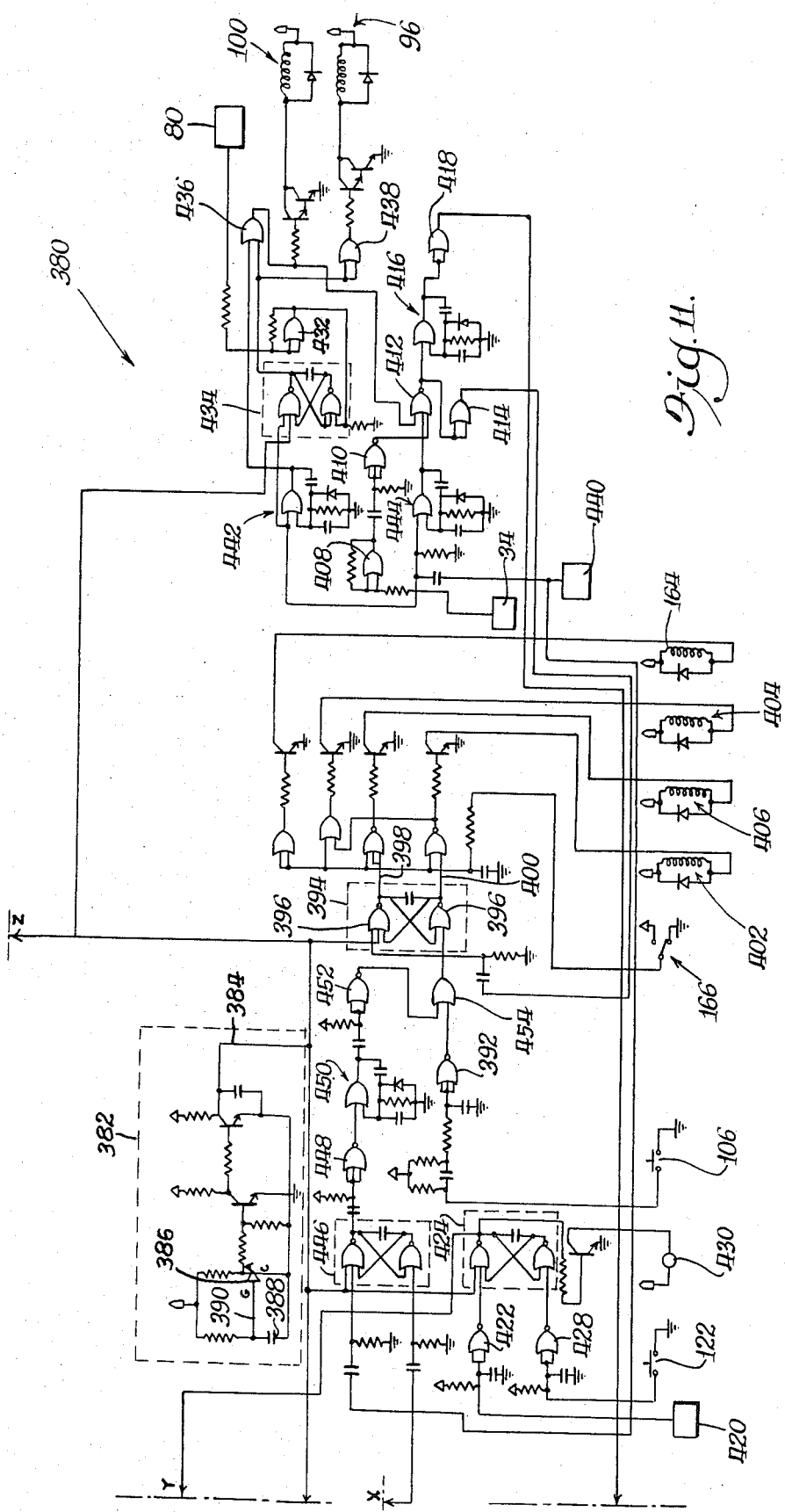
FIG. 11 illustrates a preferred embodiment of a logic circuit for controlling the operation of the various mechanical components of the device of the present invention.

FIG. 7 mainly illustrates a preferred embodiment of a circuit for controlling the operation of the various motors of the microfilm machine 20. FIG. 8 illustrates a preferred embodiment of a logic circuit for the keyboard encoder 110 (FIG. 6) and for a device for controlling the operation of the machine 20 to automatically reproduce a variable, preselectable number of copies per frame of the microfilm strip 36 (FIG. 3). FIG. 9 illustrates a preferred embodiment of a logic circuit for the indicators 116 and 126 and for controlling the operation of the machine 20 to automatically reproduce a variable, preselectable number of copies of a variable, preselectable number of consecutive frames of the microfilm strip 36 (FIG. 3). FIG. 10 illustrates a preferred embodiment of a logic circuit for a frame counter constructed in accordance with the principles of the present invention. FIG. 11 illustrates a preferred embodiment of a logic circuit for controlling the operation of several of the mechanical components of the microfilm machine 20.

In accordance with the preferred practice of electronic circuit designers, the details of the control circuitry for the microfilm viewer-printer machine 20 are represented by logic diagrams (FIGS. 7 through 11) rather than by circuit diagrams. In physically constructing the control circuit for the microfilm machine 20, each logic element shown is replaced by an equivalent electrical circuit that performs the logical task defined by the logic element. The use of logic elements emphasizes that any of the many different electrical circuits capable of performing a given logical task may be used interchangeably in the present invention.

The preferred embodiment of the control circuit for the microfilm machine 20 illustrated in FIGS. 7 through 11 utilizes three different types of logic gates: an OR gate, a NOR gate and a NAND gate. The output lead from an OR gate is high or at a more positive potential when one or more of its input leads is high or at a more positive potential. An example of an OR gate is gate 186 in FIG. 8. The output lead from a NOR gate is high or at a more positive potential only when all of the input leads to the NOR gate are low or at ground potential. An example of a NOR gate is gate 202 in FIG. 8. The output lead from a NAND gate is high or at a more positive potential at all times except when all of the inputs to the NAND gate are at a high or more positive potential, at which time the output lead from the NAND gate drops to a low or ground potential. An example of a NAND gate is gate 172 in FIG. 8. In the ensuing discussion, when an input lead or an output lead or a terminal is at a high or more positive potential it will be referred to as being "enabled." When the output lead of one of the above-mentioned gates is enabled, that gate will be referred to as being enabled.

That portion of the control circuitry illustrated in FIG. 11 utilizes several control registers formed by two cross-coupled NOR gates. The cross-coupled NOR gates form a bistable device which may be set in a first state by enabling one or more of the input leads to one of the NOR gates and may be switched to a second state by enabling one or more of the input leads of the other of the two NOR gates.

Once the NOR gate is set in a first state, it will remain in that state until switched into its second state by enabling the proper input lead as previously described. When the bistable device is set in a first state by enabling one of the input leads to a first one of the two NOR gates, the output lead of that NOR gate is at a low or ground potential and the output lead of the second of the two NOR gates is enabled. When the NOR gate is switched to its second of two states, the voltage levels on the output leads of the two NOR gates reverse, in that the output lead of the first of the two NOR gates is enabled and the output lead of the second of the two NOR gates is at a low or ground potential. An example of such a bistable control register is the register 394 in FIG. 11.

That portion of the control circuitry illustrated in FIGS. 8, 9 and 11 illustrates the use of an OR gate as a ONE-SHOT device. Such a ONE-SHOT device includes an OR gate with its output coupled across a series capacitor to one of its input leads and a parallel RC circuit connected between that input lead and ground potential. When a high or more positive voltage level, greater than the threshold voltage level of the OR gate appears at the output of the OR gate, it is instantaneously coupled across the series capacitor back to its input to thereby rapidly increase the rise time of the leading edge of the output pulse from the OR gate.

This positive voltage, which is returned to the input of the OR gate from its output, holds this OR gate in its enabled state until the series capacitor approaches a fully charged state. At this time, the feed back potential to the gate input drops below the threshold voltage level of the OR gate; and the output of the OR gate drops from a high or more positive voltage level to a low or ground potential. When this occurs, a diode connected in parallel with the parallel RC circuit and having its anode connected to ground potential becomes forwardly biased and rapidly discharges the series capacitor connected between the output and the input of the OR gate. Since the pulse width of the positive output pulse from the OR gate depends upon the time constant of the series RC circuit, the pulse width may be easily set in advance to the value required. An example of such a ONE-SHOT device is the ONE-SHOT 200 in FIG. 8.

The logic circuits disclosed in FIGS. 8 through 10 also utilize four different well-known, commercially available integrated circuits. Three of the four integrated circuits used in the present invention are available from Texas Instruments Incorporated and are a 74,100-Dual Four-Bit Latch, a 74,192-Presettable Up-Down Counter and a 7,447-Seven-Segment Decoder Driver. The fourth integrated circuit component used in the present invention is available from the Radio Corporation of America and is a DR 2,100-Seven-Segment Readout. These circuits are well-known, per se, and their functioning and interconnection in the control circuitry of the present invention will be readily apparent to those of ordinary skill in the art in light of the following discussion. Obviously, equivalent circuits may be substituted for those specifically identified herein without effecting the operation of the control circuitry of the present invention.

The control circuit for the microfilm machine 20 operates in conjunction and in synchronization with the control circuit for the printing or reproduction assembly 26 (FIGS. 1 and 3) illustrated and described in the above-identified copending application, Ser. No. 889,630. Reference should especially be made to FIG. 5 of that copending application. In the ensuing description, reference is made to the control circuit for the reproduction assembly 26 illustrated in FIG. 5 of that application; and reference numbers referring to that circuit are identified hereinafter by a suffix character X. For example, a NOR gate G1 illustrated in FIG. 5 of the above-identified copending application is identified hereinafter as G1X.

2. Motor Control: A preferred embodiment of a logic circuit 130 for controlling the operation of the motors of the present invention is illustrated in FIG. 7. Alternating current power is supplied to the input leads 132 when the main power switch 102 (FIG. 6) is placed in its ON position. The alternating current power drives a fan 134 used to prevent the optics assembly 27 from overheating, a capstan drive motor 136 used to drive the capstan drive shaft 52, and reel motors 46 and 48. The alternating current power is also used to energize the viewing lamp 84 the output of which may be regulated by a VIEWING LAMP INTENSITY CONTROL 137.

Alternating current power is applied to the reel motors 46 and 48 through an alternating current switch 138 which is conventional, per se. The switch 138 is turned on or rendered conductive when a normally open relay contact 140A is closed in response to the energization of a relay 140. The relay 140 is energized when both of a pair of normally-open tension switches 142 are closed. The tension switches 142 are controlled by the spring-biased tension arms 50 (FIG. 3). When the tension arms 50 are engaged by the microfilm strip 36 and are in the positions illustrated in FIG. 3, the normally open tension switches 142 (FIG. 7) are closed. When one or both of the tension arms 50 becomes disengaged from the microfilm strip 36 or when the microfilm strip 36 loses it normal tension, the tension arms 50 return to their at-rest positions (not illustrated) and thereby open the tension switches 142 to deenergize the relay 140 and open the relay contact 140A. The opening of the relay contact 140A turns "off" or renders the switch 138 nonconductive to remove alternating current power from the reel motors 46 and 48.

Two solenoids 144 and 146 are also energized upon the closure of both of the tension switches 142. When energized, the solenoids 144 and 146 maintain normally engaged brakes for the motors 46 and 48, respectively, disengaged.

The speeds of the motors 46 and 48 are regulated by two motor speed control circuits 148 and 150, respectively. The control circuit 148 is essentially a duplicate of the control circuit 150 and both are conventional, per se. The control circuit 150 includes two silicon unilateral switches 152 connected in opposition in parallel so that each switch 152 conducts during different half cycles of the applied alternating current. One of the silicon unilateral switches 152 is connected to a diode 154 to insure that the switches 152 conduct in sequence rather than simultaneously.

The normal operating speeds of the motors 46 and 48 are preset by the variable resistors 156. The positions of the wiper arms 158 of the variable resistors 160 are determined by the position of the RAPID SCAN CONTROL switch 104 (FIG. 6) when the switch 104 is moved from its STOP position. A pair of normally open relay contacts 164A (FIG. 7) are closed when a rapid scan relay 164 (FIG. 11) is energized. The relay 164 is energized when a normally grounded rapid scan switch 166 (FIG. 11) is switched to a high voltage level. The switch 166 is switched to a high voltage level whenever the RAPID SCAN CONTROL switch 104 (FIG. 6) is moved from its STOP position.

3. Keyboard Encoder: The control circuit 168 (FIG. 8) for the keyboard encoder 110 (FIG. 6) is illustrated in FIG. 8. The circuit 168 performs the dual function of programming into the microfilm machine 20 the number of copies per microfilm frame to be printed and the number of consecutive frames to be printed by the machine 20.

The number entered into the machine 20 in response to the depression of each of the keys 170 (FIG. 8) is numerically indicated adjacent each key in FIG. 8. The keys 170 operate through four NAND gates 172, 174, 176 and 178 to store in binary form both a units digit and a tens digit in a common memory 180.

The common memory 180 comprises the integrated circuit 74,100 discussed previously. As illustrated in FIG. 8, a right-hand side 182 of the memory 180 is used for storing the units digit of a number entered into the memory 180 by the operator of the machine 20. A left-hand side 184 of the memory 180 is used for storing the tens digit of a number entered into the memory 180 by the operator of the machine 20.

In order to illustrate the operation of the circuit 168, the number "96" will be entered into the memory 180. The memory 180 is initially set to "0" when the MAIN POWER switch 102 (FIG. 6) of the machine 20 is placed in its ON position. The memory 180 is set to 0 by a positive pulse passing through three OR gates 186, 188 and 189. These gates enable the units digit STROBE input lead 190 and the tens digit STROBE input lead 192. When these leads are enabled, they cause their respective sides of the memory 180 to read and store or "strobe" the remaining four input leads on each side of the memory 180. To enter the number "96" into the memory 180, the key 170 corresponding to the tens digits "9" is pressed by the operator of the machine 20. Pressing the key 170 corresponding to the numeral 9 results in enabling the NAND gates 178 and 172. Enabling the NAND gates 172 and 178 results in enabling the corresponding input leads to the units side 182 of the memory 180. Simultaneously, the tens digit STROBE input lead 192 is enabled through an OR gate 194, a ONE-SHOT 196 and the OR gate 188. Enabling the STROBE lead 192 causes the tens side 184 of the memory 180 to strobe its input leads. The input leads to the tens side 184 are connected to the output leads of the units side 182 of the memory 180 and since the units side 182 had previously been preset to 0, none of the output leads of the units side 182 are enabled, and thus none of the input leads to the tens side 184 of the memory 180 are enabled, causing the number 0 to be stored in binary form in the tens side 184 of the memory 180.

The NOR gate 189 is enabled by the trailing edge of a pulse from the ONE-SHOT 196 and itself enables a ONE-SHOT 200. The ONE-SHOT 200 enables the OR gate 189 which enables the STROBE input lead 190 to the units side 182 of the memory 180. The STROBE lead 190 is thus enabled subsequently to the enabling of the STROBE lead 192, after a finite time delay. Enabling the STROBE lead 190 causes the units side 182 of the memory 180 to strobe its four input leads and to thereby store the numeral 9 corresponding to the enabled NAND gates 178 and 172 in binary form.

To complete the storing of the number 96 in the memory 180, the operator would then press the key 170 corresponding to the units digit "6". Pressing the key 170 corresponding to the numeral 6 enables the NAND gates 174 and 176. The enabled NAND gates thereby enable the STROBE input lead 192 through the OR gate 194, the ONE-SHOT 196 and the OR gate 188. Enabling the STROBE lead 192 causes the tens side 184 of the memory 180 to strobe its input leads which are connected to the corresponding output leads of the units side 182 of the memory 180. Since the numeral 9 had previously been stored in binary form in the units side 182 of the memory 180, two of the output leads of the units side 182 are enabled corresponding to the binary number 9 and thereby enable the corresponding input leads to the tens side 184 of the memory 180. Thus, the numeral 9 is thereby stored in binary form in the tens side 184 of the memory 180. The STROBE input lead 190 is subsequently enabled as discussed above and cases the units side 182 of the memory 180 to strobe its input leads. Two of its four input leads are enabled corresponding to the enabled NAND gates 174 and 176; and, thus, the numeral 6 is stored in the units side 182 of the memory 180. The number 96 is now stored in the memory 180 in binary form.

The digit 0 may be stored, for example, in the units side 182 of the memory 180 by depressing the key 170 corresponding to the numeral 0. Depressing the key 170 corresponding to the numeral 0, enables a NOR gate 202 which, in turn after a finite delay, enables the STROBE input lead 190. The units side 182 of the memory 180 is thus caused to strobe its four input leads, none of which are enabled since none of the four NAND gates 172, 174, 176 and 178 are enabled when the key 170 corresponding to the numeral 0 is depressed. The number 0 is thus stored in binary form in the units side 182 of the memory 180.

4. Copies/Frame Control: A circuit 204 for controlling the microfilm machine 20 (FIG. 3) to automatically print or reproduce a desired number of copies of an image on the microfilm strip 36 is illustrated in FIGS. 8 and 9. The circuit 204 includes a memory 206 comprising the component 74,100 discussed previously. The memory 206 is used to store a units digit in binary form in a units side 208 of the memory 206. The tens digit of a desired number of copies to be made is stored in a tens side 210 of the memory 206. The STROBE input leads 212 to the units side 208 and to the tens side 210 of the memory 206 are enabled simultaneously and cause the memory 206 to strobe its input leads to thereby store in binary form in the memory 206 the number previously stored in binary form in the memory 180.

The memory 206 is initially preset to 0 as is the memory 180 by a preset pulse which enables the STROBE input leads 212 through two OR gates 186 and 214. Since the memory 180 is simultaneously preset to 0, none of the output leads of the memory 180 are enabled. Therefore, strobing the input leads of the memory 206 results in the storing of the number 0 in binary form in the memory 206.

The memory 206 is caused to store in binary form the number previously stored in the memory 180 when its STROBE input lines 212 are enabled in response to the depression of the STROBE button 112. Depressing the STROBE button 112 enables a NOR gate 216 which thereby enables a ONE-SHOT 218. Enabling the ONE-SHOT 218 enables the OR gate 214 which in turn enables the STROBE input leads 212 to the memory 206.

Two, serially-connected, presettable up-down counters 220 and 222, both formed of the component 74,192, previously discussed, are used to control the machine 20 to automatically print or reproduce the desired number of copies programmed into the memory 206 by the keyboard encoder 110 and the STROBE button 112. The counters 220 and 222 are initially set to count down only. The counters 220 and 222 are initially preset to 0 by a preset pulse through two OR gates 186 and 224 which enables a pair of CLEAR input leads 226. Enabling the leads 226 results in the counters 220 and 222 being set to 0.

The counters 220 and 222 are preset to the number previously stored in the memory 206 when a low or ground potential is applied to a pair of STROBE input leads 228 in response to the trailing edge of the pulse from the ONE-SHOT 218. The trailing edge of the pulse from the ONE-SHOT 218 enables a NOR gate 230 which in turn enables a ONE-SHOT 232. The leading edge of the pulse from the ONE-SHOT 232 drives the output of a NOR gate 234 low and, thus, momentarily applies a low or ground potential to the leads 228. When the leads 228 are driven low, the counters 220 and 222 strobe their four binary input leads and are thus preset to the digits representing the desired number of copies to be made by the machine 20 as previously stored in binary form in the memory 206.

The counters 220 and 222 each reduce their numbers internally stored by one in response to the trailing edge of each enabling pulse to a pair of CLOCK input leads 236. The lead 236 to the counter 222 for the units digit is enabled in response to the enabling of the output lead 368X of the ONE-SHOT G20X of the logic control circuit for the printing or reproduction assembly 26 illustrated in FIG. 5 of the above-identified copending application. The output lead 368X is enabled each time a sheet of copy material 64 (FIG. 3) is severed at the cutting station 68. Enabling the output lead 368X drives the output of a NOR gate 238 to a low or more negative voltage level thereby enabling a NOR gate 240. Enabling the NOR gate 240 enables a ONE-SHOT 242 which in turn enables the CLOCK input lead 236 to the counter 222, causing the counter 222 to reduce its internally stored number by one on the trailing edge of the enabling pulse.

Each time the counter 222 reduces its internally stored number from a binary 0 to a binary 9, an output pulse is provided to the CLOCK input lead 236 of the counter 220. This causes the counter 220 to reduce its internally stored number by one. Thus, the counters 222 and 220 reduce their internally stored numbers in response to the severing of copy material sheets 64 until the counters 222 and 220 arrive at the binary number 0.

Eight output leads 244 of the counters 222 and 220 are enabled in response to the binary number presently stored within the counters 222 and 220. Thus, when the counters 222 and 220 arrive at the counts of binary 0, none of the output leads 244 are enabled. A copies per frame coincidence circuit 246 comprising two OR gates 248 and a NOR gate 250 is then enabled. Enabling the copies per frame coincidence circuit 246 causes a positive pulse to be transferred to other portions of the control circuitry for the microfilm machine 20 to perform various functions to be described hereinafter. Enabling the coincidence circuit 246 also causes the counters 220 and 222 to be reset to the number previously stored in binary form in the memory 206.

The counters 220 and 222 are reset by applying a low or more negative voltage level to the STROBE input leads 228. This occurs when the output of the NOR gate 236 is driven to a low or more negative voltage level in response to the enabling of a NOR gate 252. The NOR gate 252 is enabled in response to the trailing edge of the pulse from a ONE-SHOT 254 which is enabled in response to the enabling of the copies per frame coincidence circuit 246.

The output leads 244 of the counters 220 and 222 represent the number presently internally stored within the counters 220 and 222 in binary form. The output leads 244 are used to control a copies per frame indicator 116 (FIG. 9) which provides a continuous visual indication of the exact number presently stored within the counters 220 and 222. The indicator 116 includes a units digit indicator 256 and a tens digit indicator 258 which provide a visual indication of the number presently stored in binary form in the counter 222 and in the counter 220, respectively. Each of the indicators 256 and 258 are formed of the component 7447 and the component DR 2,100, both previously discussed. The indicators 256 and 258 are conventional, per se; and, thus, do not require a further detailed discussion.

Enabling the copies per frame coincidence circuit 246 (FIG. 8) enables two OR gates 264 and 266 and a terminal 268. The terminal 268 is connected to a lower input of a NOR gate G1X and to two inputs of a second NOR gate G2X, illustrated in FIG. 5 of the above-identified copending application. When used as the printing or reproduction assembly 26 of the microfilm viewer-printer machine 20 in accordance with the principles of the present invention, the MULTIPLE COPY REQUEST switch 412X of the device of the above-identified copending application is discarded. The voltage present at the terminal 268 (FIG. 8) is used to control the NOR gates G1X and G2X. Thus, enabling terminal 268 maintains the output of NOR gate G1X at a low or ground potential and, thus, prevents print pulses from being presented to the input of a NOR gate G6X. When the terminal 268 is at a low or ground potential, print pulses are permitted to pass from an OR gate G28X through the NOR gate G1X to the NOR gate G6X. Thus, copies are continuously reproduced by the device of the above-identified copending application unless terminal 268 is enabled.

5. Consecutive Frames Control: A circuit 270 for controlling the microfilm machine 20 to automatically print or reproduce the desired number of copies of images from a desired number of consecutive frames on the microfilm strip 36 (FIG. 3) is illustrated in FIG. 9. The circuit 270 operates essentially the same as the circuit 204 (FIG. 8) except that it lacks the reset capability of the circuit 204. The circuit 270 includes a pair of presettable up-down counters 272 and 274. The same commercially available components used for the counters 220 and 222 are used for the counters 272 and 274, respectively. The counter 272 is used to store in binary form the tens digit of the number of consecutive frames desired to be automatically reproduced by the machine 20. The counter 274 is used to store the units digit of that number. The counters 272 and 274 are initially preset to 0 by a preset pulse passing through an OR gate 276 as more fully discussed above with reference to the counters 220 and 222. The counters 272 and 274 are caused to strobe their four input lines and, thus, to store in binary form the number previously entered into the memory 180 (FIG. 8) by depressing the STROBE button 114 to cause a pair of STROBE input leads 278 to fall to a low or ground potential. Depression of the STROBE button 114 enables a NOR gate 280 which in turn enables a ONE-SHOT 282. Enabling the ONE-SHOT 282 causes a low or ground potential to appear at the output of a NOR gate 284. This momentarily causes a low or ground potential to appear on the leads 278, thereby causing the counters 272 and 274 to strobe their input leads.

The counter 274 is caused to reduce its stored count by one whenever a CLOCK input lead 286 is driven to a low or ground potential. This occurs in response to the enabling of a NOR gate 250 (FIG. 8) of the coincidence circuit 246. Enabling the NOR gate 250 enables an OR gate 288 (FIG. 9) which in turn enables a ONE-SHOT 290. Enabling the ONE-SHOT 290 causes the output of a NOR gate 292 to assume a low or ground potential. Thus, the CLOCK input lead 286 is driven to a low or ground potential to cause the counter 274 to reduce its count by one. Similarly to the counter 220 (FIG. 8), the counter 272 is caused to reduce its previously stored number by one each time the counter 274 counts down from a binary 0 to a binary 9. The counters 272 and 274 continue to count down until they both reach the binary number 0. When the counters 272 and 274 both reach the binary number 0, a consecutive frames coincidence circuit 294 formed by a pair of OR gates 296 and a NOR gate 298 is enabled to thereby enable terminal 268 (FIG. 8) which in turn prevents the printing or reproduction assembly 26 from reproducing further copies.

Eight output leads 300 of the counters 272 and 274 control the number of consecutive frames indicator 118 to thereby provide a visual indication of the number of consecutive frames at that moment stored in the counters 272 and 274. The indicator 118 is identical to the indicator 116 and, thus, reference should be made to the description above for the indicator 116 for a full description of the indicator 118.

6. Reference Frame Counter: A reference frame counter 330 is provided in accordance with the principles of the present invention to indicate to the operator of the microfilm machine 20 the consecutive number of the frame at that moment being viewed on the viewing screen 30 (FIG. 3) or being reproduced by the printing assembly 26 and is illustrated in FIG. 10. The reference frame counter 330 includes five, serially connected, presettable up-down counters 332, each formed of the component 74,192, previously discussed. Each of the counters 332 includes a seven-segment decoder driver 260 and a seven-segment readout 262 which are identical to those described above with reference to the copies per frame indicator 116 (FIG. 9). Each of the counters 332 with its associated decoder driver 260 and readout 262 forms one of a series of vertical columns 334, 336, 338, 340 and 342 for monitoring and visually indicating the units digit, the tens digit, the hundreds digit, the thousands digit and the tens of thousands digit, respectively, of the consecutive number of the frame at that moment being viewed or reproduced by the microfilm machine 20.

The counters 332 are initially preset to 0 by a preset pulse which drives the output of a NOR gate 344 to a low or ground potential, thereby enabling a NOR gate 346. Enabling the NOR gate 346 enables a CLEAR input lead 347 for each of the counters 346 and results in the counters 332 being set to 0. The counters 332 may be set to 0 at any time during the operation of the machine 20 by depressing a CLEAR button 128, thereby enabling the NOR gate 346.

The reference frame counter 330 is designed to count up when the film strip 36 (FIG. 3) is being moved through the machine 20 in a forward direction and to count down when the microfilm strip 36 is being moved through the machine 20 in a reverse or rewind direction. Each time the optical sensor 34 (FIG. 1) located on the viewing screen 30 senses a reference mark 38 (FIG. 2) adjacent each frame 40 on the microfilm strip 36, a positive pulse is provided to the input of a NOR gate 348 (FIG. 10). The counter 332 for the units digit includes two CLOCK input leads 350 and 352. If the CLOCK input lead 350 is enabled and maintained at a high or more positive potential, the counters 332 will count up in response to CLOCK pulses provided to the input lead 352. If the input lead 352 is enabled and maintained at a high or more positive potential, the counters 332 will count down in response to CLOCK pulses presented to the input lead 350. The voltage levels on the CLOCK input leads 350 and 352 are controlled by a direction circuit 354. The direction circuit 354 includes a light source 356 and a light sensitive detector 358. When the light from the source 356 is unblocked and detected by the detector 358, the CLOCK input lead 350 is enabled and held at a high or more positive potential, permitting the counters 332 to count up in response to CLOCK pulses appearing at the CLOCK input lead 352. When light from the source 356 is unblocked, the detector 358 is rendered conductive to enable a NOR gate 360 which in turn holds the output of a NOR gate 362 at a low or ground potential, thereby enabling a NOR gate 364. When this occurs, a NOR gate 366 is enabled in response to positive CLOCK pulses provided to the OR gate 348 and thereby provides CLOCK pulses through a NOR gate 368 to the CLOCK input lead 352 causing the counters 332 to count up. The serial connection of the five counters 332 is conventional, per se; and, thus, its operation is not further discussed herein.

When the light from the source 356 is blocked and thus not detected by the detector 358, the CLOCK input lead 352 is enabled and held at a high or more positive potential, thereby permitting the counters 332 to count down in response to CLOCK pulses received at the CLOCK input lead 350. The detector 358 in a blocked condition is rendered nonconductive thereby enabling the NOR gate 368 to in turn enable the input lead 352 and maintain the lead 352 at a high or more positive potential. Thus, the counters 332 are enabled to count down in response to CLOCK pulses received at the CLOCK input lead 350.

It is apparent that when the microfilm strip 36 (FIG. 3) is being transported through the machine 20 in a forward direction, the light from the source 356 (FIG. 10) should be unblocked and permitted to be detected by the detector 358 to permit the counters 332 to count up. When the microfilm strip 36 is being transported through the machine 20 in a reverse direction, the light from the source 356 should be blocked, thus rendering the detector 358 nonconductive and causing the counters 332 to count down.

A device 370 for passing light from the source 356 when the microfilm strip 36 is being transported through the machine 20 in a forward direction and for blocking light from the source 356 when the microfilm strip 36 is being transported through the machine 20 in a reverse or rewind direction is illustrated in FIG. 13. The device 370 includes a sliding member 372 movable between two stop positions 374 and having a friction face 376 in light contact with the surface of the rotating capstan drive shaft 52. The sliding member 372 is caused to move in a first or a second direction depending upon the direction of rotation of the capstan drive shaft 52. Thus, by placing the light source 356 and the light sensitive detector 358 on opposite sides of the sliding member 372, light from the light source 356 may be blocked from or passed to the detector 358 depending upon the direction of rotation of the capstan drive shaft 52 which rotates in either a first or a second direction depending upon the forward or reverse movement of the microfilm strip 36 through the machine 20.

7. Operational Control: A circuit 380 for controlling the operation of the various mechanical functions of the microfilm machine 20 is illustrated in FIG. 11. The circuit 380 includes a preset circuit 382 for providing a positive preset pulse of a predetermined duration when the machine 20 is initially turned on. An output line 384 of the circuit 382 is enabled until a silicon unilateral switch 386 is rendered conductive. The silicon unilateral switch 386 is rendered conductive when a capacitor 388 connected between a gate terminal 390 of the switch 386 and ground is charged to a predetermined voltage level. As is apparent from the circuit 382, when the switch 386 is rendered conductive, the output line 384 drops to ground potential. The preset pulse from the preset circuit 382 is used to set the various control registers of the control circuit 380 and the counters mentioned above to their initial state.

After the machine 20 is powered up, a single frame advance switch 106 is pressed by the operator to advance the microfilm strip 36 to its first frame. Depressing the switch 106 enables a NOR gate 392 which in turn causes a bistable control register 394 to change state from its initially preset state. The control register 394 comprises a pair of cross-coupled NOR gates 396 as more fully discussed above. The control register 394 and the other control registers to be discussed hereinafter have two states, a preset state or first state and the other of its two states or a second state. This terminology is utilized throughout the remaining disclosure.

The register 394 has two output leads 398 and 400. In its first state, the output lead 398 is at a low or ground potential and the output lead 400 is enabled. The enabled lead 400 deenergizes a capstan clutch control solenoid 402 and a film hold-down control solenoid 404. Thus, the capstan drive shaft 52 (FIG. 3) is disengaged from the capstan drive motor 136 (FIG. 7). When the film hold-down control solenoid 404 (FIG. 11) is deenergized, the microfilm strip 36 (FIG. 3) is engaged by the film hold-down assembly 54 and held in a planar, stationary condition. Energizing the film hold-down control solenoid 404 (FIG. 11) disengages the microfilm strip 36 from the film hold-down assembly 54, thereby permitting the microfilm strip 36 to be transported through the microfilm machine 20. The control register 394 in its first state also maintains a capstan brake control solenoid 406 energized to cause a brake (not illustrated) to be applied to the capstan drive shaft 52 (FIG. 3) to prevent the drive shaft 52 from rotating and to thereby prevent the microfilm strip 36 from being transported through the microfilm machine 20.

After being switched to its second state in response to the depression of the single frame advance button 106 (FIG. 11), the control register 394 energizes the capstan clutch control solenoid 402 and the film hold-down control solenoid 404 and deenergizes the capstan brake control solenoid 406. This permits the microfilm strip 36 to be driven in a forward direction through the microfilm machine 20 by the capstan drive motor 136 (FIG. 7).

When a reference mark 38 (FIG. 2) is detected by the optical sensor 34 (FIG. 1) in the viewing screen 30, a positive pulse is provided to enable an OR gate 408 (FIG. 11) causing the output of a NOR gate 410 to momentarily assume a low or ground potential to thereby enable a NOR gate 412. Enabling the NOR gate 412 enables an OR gate 414 which in turn resets the control register 394 to its first state. This causes the film strip 36 to stop and a projected image of the first frame to appear on the viewing screen 30 (FIG. 1). A count pulse is also provided through a ONE-SHOT 416 and an OR gate 418 to the NOR gate 348 (FIG. 10) to cause the reference frame counter 330 to increase its stored and indicated count by one. The first frame on the microfilm strip 36 is thus ready for viewing on the viewing screen 30 (FIG. 1) or for printing by the printing or reproduction assembly 26.

If the operator of the microfilm machine 20 wishes to advance the microfilm strip 36 to a later appearing frame, he may do so by continuous, successive depressions of the single frame advance button 106 (FIGS. 6 and 11) or by switching the rapid scan control switch 104 (FIG. 6) from its STOP position to its FORWARD position to thereby switch the normally grounded rapid scan switch 166 (FIG. 11) to a high positive potential. In its switched condition, the rapid scan switch 166 deenergizes the capstan clutch control solenoid 402, the film hold-down control solenoid 404 and the capstan brake control solenoid 406 and energizes the rapid scan relay 164. Energizing the rapid scan relay 164 causes the normally open relay contacts 164A (FIG. 7) to close thereby supplying more electrical current to the motor 48 resulting in the advancement of the microfilm strip 36 in a rapid scan mode. The optical sensor 34 (FIG. 1) supplies a positive pulse each time a reference mark 38 (FIG. 2) is detected to thereby advance the reference frame counter 330. However, the pulses from the optical sensor 34 do not effect the state of the solenoids 402, 404 and 406 and the relay 164 since these are under the control of the rapid scan switch 166. The operator of the microfilm machine 20 may stop the advancement of the microfilm strip 36 through the machine 20 by returning the rapid scan control switch 104 (FIG. 7) to its STOP position.

The print cycle of the printing or reproduction assembly 26 is initiated by depressing the PRINT button 120 (FIG. 6). Depressing the PRINT button 120 (84X) initiates the copy material transport mechanism of the printing or reproduction assembly 26, as more fully discussed in the above-identified copending application and causes ground potential to be applied to a terminal 420 which is directly connected to the nongrounded terminal of the PRINT switch 84X. This in turn enables a NOR gate 422 to insure that a bistable control register 424 is set to its first state (its preset state). In its first state, the output of the control register 424 provides a low or ground potential to an OR gate 426 (FIG. 8). If the counters 220 and 222 and 272 and 274 (FIG. 9) are at any number other than 0, the terminal 268 (FIG. 8) is at a low or ground potential to thereby place the printing or reproduction assembly 26 of the above-identified copending application in its multiple copy mode.

A STOP-PRINT button 122 (FIG. 11) may be depressed by the operator to take the printing or reproduction assembly 26 of the above-identified copending application out of its multiple copy mode and to thereby interrupt the printing of any further copies by the reproduction assembly 26. Depressing the STOP-PRINT button 122 enables a NOR gate 428 which switches the bistable control register 424 to its second state. In its second state, the control register 424 enables the terminal 268 (FIG. 8) to take the printing or reproduction assembly 26 out of its multiple copy mode. The printing cycle of the assembly 26 may be re-initiated by a subsequent depression of the PRINT button 120 to thereby enable the NOR gate 422 and cause the control register 424 to switch to its first state as described previously. In its second state, the control register 424 energizes a PRINT-HOLD light 430 to provide a visual indication that the printing cycle of the microfilm machine 20 has been interrupted.

Depressing the PRINT button 120 (FIG. 6) causes copy material 64 (FIG. 3) to bee transported through the printing assembly 26. The leading edge of the copy material 64 is eventually detected by a shutter and mirror control sensor 80 (FIGS. 4 and 11) which then provides a positive pulse to enable an OR gate 432 (FIG. 11) to thereby switch a bistable control register 434 to its second state. In its second state, the register 434 enables two OR gates 436 and 438 to thereby energize a shutter control solenoid 100 and a mirror control solenoid 96. Energizing the shutter control solenoid 100 causes the shutter 98 (FIG. 5) to totally block the illumination from the viewing lamp 84. Subsequently, the energized mirror control solenoid 96 moves the reflective surface 94 out of the path of the projected image from the microfilm strip 36 to permit a sheet of copy material 64 (FIG. 3) to be exposed at the exposure station 58. Enabling the OR gate 436 holds the output of the NOR gate 412 at a low or ground potential to prevent any false count pulses from arising. When the leading edge of the copy material 64 (FIG. 4) is detected by the exposure sensor 82, the xenon arc exposure lamp 88 (FIG. 5) is energized to expose a sheet of copy material 64 (FIG. 3) at the exposure station 58. A terminal 440, directly connected to the output of a ONE-SHOT G23X, is enabled to thereby enable two ONE-SHOTS 442 and 444. The ONE-SHOT 442 resets the register 434 to its first state to thereby deenergize the solenoid 96. The solenoid 100 is held energized by the ONE-SHOT 442 for a predetermined time delay until the reflective surface 94 (FIG. 5) fully returns to its at-rest position as illustrated in FIG. 5, at which time the solenoid 100 is deenergized to remove the shutter 98 from its blocking position. The ONE-SHOT 444 holds the output of the NOR gate 412 at a low or ground potential to prevent any false count pulses from arising during this operation.

If the microfilm machine 20 is in its multiple copy mode and if additional copies of a particular frame remain to be made, the control register 434 is switched to its second state when the shutter and mirror control sensor 80 detects the leading edge of the next sheet of copy material 64.

Enabling the terminal 440 also provides a positive pulse to a bistable control register 446 to insure that the register 446 is in its first state. The register 446 is switched to its second state when the copies per frame coincidence circuit 446 (FIG. 8) is enabled after the last sheet of copy material 64 of the number of copies requested per frame is severed at the cutter station 68 (FIG. 3). This causes the counters 220 and 222 (FIG. 8) to reach a count of 0, thereby enabling the coincidence circuit 246 (FIG. 8). After the register 446 has been switched to its second state, the terminal 440 is enabled when the last sheet of copy material 64 of the desired number of copies to be made per frame is exposed. Enabling the terminal 440 causes the register 446 to switch from its second state to its first state and to thereby enable a NOR gate 448. The enabled NOR gate 448 enables a ONE-SHOT 450 to in turn enable a NOR gate 452 on the trailing edge of the pulse from the ONE-SHOT 450. The enabled NOR gate 452 enables the NOR gate 454 to switch the control register 394 to its second state. In its second state, the control register 394 causes the microfilm machine 20 to advance the microfilm strip 36 in a forward direction to the next frame for viewing or for copying by the printing or reproduction assembly 26 as described previously.

If the counters 272 and 274 (FIG. 9) are at any number other than 0, the consecutive frame coincidence circuit 294 is not enabled and, thus, the terminal 268 (FIG. 8) is at a low or ground potential to maintain the printing or reproduction assembly 26 in its multiple copy mode. The microfilm machine 20 advances the microfilm strip 36 to the next frame to be copied before the timing-out of the tailgate timer 274X of the above-identified copending application. Thus, when the tailgate timer 274X times-out, a positive pulse is presented to the input of the NOR gate G1X. The NOR gate G1X is enabled by the trailing edge of the positive pulse from the tailgate timer 274X to initiate the copying cycle for the next frame of the microfilm strip 36 to be copied. When the desired number of copies of the desired number of consecutive frames have been printed by the microfilm machine 20, the consecutive frames coincidence circuit 294 (FIG. 9) is enabled to thereby enable the terminal 268 (FIG. 8) and, thus, remove the printing or reproduction assembly 26 from its multiple copy mode and thereby prevent the initiation of a subsequent copying cycle by the printing assembly 26 in response to the output pulse from the tailgate timer 274X.

Set-Up and Operation

In normal operation of the microfilm viewer-printer machine 20, an operator initially loads the load reel 42 (FIG. 3) of microfilm in the viewing assembly 22, threads the microfilm strip 36 around the tension arms 50 and through the film hold-down assembly 54 and attaches the lead end of the microfilm strip 36 to the take-up reel 44. The reel 44 is turned in the clockwise direction and the reel 42 is turned in the counterclockwise direction to provide the proper tension on the microfilm strip 36. The microfilm machine 20 is now ready to be turned on.

The microfilm machine 20 is turned on by placing the main power switch 102 (FIG. 6) in its ON position. The viewing lamp 84 (FIG. 7), the fan 134 and the motors 46, 48 and 136 are then energized. The indicators 116 (FIG. 6), 118 and 126 are set to 0. The microfilm strip 36 (FIG. 3) is advanced to its first frame in a slow scan mode of operation by depressing the single frame advance button 106 (FIG. 6). The microfilm strip 36 is stopped upon the detection of a reference mark 38 (FIG. 2) adjacent the first frame 40 on the microfilm strip 36 by the optical sensor 34 (FIG. 1) in the viewin screen 30. The optical sensor 34 is manually adjustable in the cutout portion 32 of the viewing screen 30 so that the projected image of each frame 40 (FIG. 2) may be accurately centered on the viewing screen 30 (FIG. 1).

Alternately, the microfilm strip 36 (FIG 3) may be advanced in a rapid scan mode of operation by switching the rapid scan control switch 104 (FIG. 6) from its STOP position to its FORWARD position. The microfilm strip 36 is then advanced by the motors 48 and 46 and may be stopped by the operator of the machine 20 when the desired frame, as indicated by the frame counter indicator 126 (FIG. 6), is reached. The desired frame may then be viewed on the viewing screen 30 (FIG. 1).

Alternately, the printing cycle of the microfilm machine 20 may be initiated by entering the desired number of copies per frame and the desired number of consecutive frames to be copied into the circuits 204 (FIG. 8) and 270 (FIG. 9) as described above. The print cycle of the machine 20 may then be started by depressing the PRINT button 120 (FIG. 6) to cause the microfilm machine 20 to automatically reproduce the desired number of copies of each of a desired number of consecutive frames on the microfilm strip 36 (FIG. 3).

When the printing operation is completed, the machine 20 will advance the microfilm strip 36 to the next frame 40 (FIG. 2) for viewing or copying as determined by the operator of the machine 20. If further viewing or copying of frames 40 on the microfilm strip 36 is desired, the microfilm strip 36 may be advanced to the desired frame or frames by the single frame advance button 106 (FIG. 6) in a slow scan mode of operation or by the rapid scan control switch 104 in a rapid scan mode of operation.

If the operator of the microfilm machine 20 has finished viewing and copying frames 40 on the microfilm strip 36 (FIG. 3), the microfilm strip 36 may be rewound onto the load reel 42 by switching the rapid scan control switch 104 (FIG. 6) from its STOP position to its REWIND position. This causes the motors 46 and 48 to rewind the microfilm strip 36 until it is totally loaded on the reel 42.

When the microfilm strip 36 becomes disengaged from the take-up reel 44, one or both of the movable, spring-biased tension arms 50 will return to its normal at-rest position to thereby deenergize the motors 46 and 48 and to apply a brake to each of the motors 46 and 48. The load reel 42 is then removed from the microfilm machine 20 and the main power switch 102 (FIG. 6) is switched to its OFF position to thereby turn off the microfilm viewer-printer machine 20.

Thus, a new and improved automated microfilm viewer-printer machine 20 has been provided for selectively viewing or reproducing images on a microfilm strip 36. The microfilm machine 20 when placed in its printing mode is capable of automatically reproducing a variable, preselectable number of copies of each of a variable, preselectable number of frames 40 on a microfilm strip 36. Obviously, many modifications and variations of the present invention are possible in light of the above teachings. For example, it would obviously be possible for one of ordinary skill in the art in light of the above teachings to modify the reference frame counter 330, the copies/frame control circuit 204 and the consecutive frames control circuit 270 to count and automatically control the copying of a plurality of original documents other than images from a microfilm strip 36 to reproduce a variable, preselectable number of copies of a variable, preselectable number of the plurality of original documents. Further, it is clear that the optics assembly of the present invention including the shutter and mirror assemblies could be used to selectively view or reproduce copies of micro-images stored in microfiche form. It is therefore to be understood that, within the scope of the appended claims, the invention may be practiced otherwise than as specifically described.

What is claimed and desired to be secured by Letters Patent of the United States is:

1. A device for selectively viewing or reproducing micro-images comprising
    means for moving said micro-images through said device,
    a viewing screen for exhibiting projections of said micro-images,
    means for reproducing copies of said micro-images and
    an optical assembly for providing the illumination required to selectively project said micro-images to said viewing screen or to said reproducing means, said optical assembl including a first radiation source providing the illumination required to project said micro-images to said viewing screen and a second radiation source providing the illumination required to project said micro-images to said reproducing means, the emitted radiation of both of said first and said second radiation sources being focused at the same point to thereby simulate a single point source of light.

2. A device as recited in claim 1 wherein said optical assembly further includes a movable reflecting means positioned in the path of said emitted radiation from said radiation sources for reflecting the emitted radiation from said first radiation source to said viewing screen and movable from said path to pass the emitted radiation from said second radiation source to said reproducing means.

3. A device as recited in claim 1 further comprising means for continuously energizing said first radiation source during the entire operation of said device.

4. A device as recited in claim 3 wherein said optical assembly further includes a movable shutter means positioned in the path of the emitted radiation from said first radiation source during the reproducing operation of said device to prevent the emitted radiation from said first radiation source from passing to said reproducing means and movable from said path during the viewing operation of said device to permit the emitted radiation from said first radiation source to pass to said viewing screen.

5. A device as recited in claim 4 wherein said shutter means is positioned between said first and said second radiation sources.

6. A device as recited in claim 1 further comprising means responsive to the movement of each micro-image through said device interrupting the movement of said micro-image through said device to enable the projection of said micro-image to appear at a predetermined location on said viewing screen.

7. A device as recited in claim 1 wherein said first and second radiation sources are collinearly positioned in said device in a spaced-apart relation along a linear optical axis, said illumination from said first radiation source and said illumination from said second radiation source being directed along said optical axis.

8. A device as recited in claim 1 wherein said optical assembly further includes a condenser lens assembly for receiving the emitted radiation from said radiation sources and for presenting said radiation in equal amounts to each portion of the surface area of each of said micro-images, wherein the emitted radiation from said first radiation source and the emitted radiation from said second radiation source traverse the same path of travel through said condenser lens assembly.

9. A device for selectively viewing or reproducing micro-images of the type having a reference indicia associated with each one of said micro-images, said device comprising means for moving said micro-images through said device,
a viewing screen for exhibiting projections of said micro-images,
means for reproducing copies of said micro-images,
an optical assembly for providing the illumination required to selectively project said micro-images to said viewing screen or to said reproducing means, said optical assembly including a first radiation source providing the illumination required to project said micro-images to said viewing screen and a second radiation source providing the illumination required to project said micro-images to said reproducing means, the emitted radiation of both of said first and said second radiation sources being focused at the same point to thereby simulate a single point source of light, and
means responsive to the movement of each micro-image through said device for interrupting the movement of said micro-image through said device to enable the projection of said micro-image to appear at a predetermined location on said viewing screen,
said interrupting means including an optical sensor positioned in said viewing screen and responsive to said reference indicia to interrupt the movement of said micro-image through said device to enable the projection of said micro-image to appear at a predetermined location on said viewing screen.

10. A device as recited in claim 9 wherein said optical sensor is movable within a predetermined portion of said viewing screen to enable the adjustment of the location of said projection of said micro-image on said viewing screen.

11. A device for selectively viewing or reproducing micro-images comprising means for moving said micro-images through said device,
a viewing screen for exhibiting projections of said micro-images,
means for reproducing copies of said micro-images and
an optical assembly for providing the illumination required to selectively project said micro-images to said viewing screen or to said reproducing means, said optical assembly including a first radiation source providing the illumination required to project said micro-images to said viewing screen and a second radiation source providing the illumination required to project said micro-images to said reproducing means, the emitted radiation of both of said first and said second radiation sources being focused at the same point to thereby simulate a single point source of light,
movable reflecting means positioned in the path of said emitted radiation from said radiation sources for reflecting the emitted radiation from said first radiation source to said viewing screen and movable from said path to pass the emitted radiation from said second radiation source to said reproducing means and
a movable shutter means positioned in the path of the emitted radiation from said first radiation source during the reproducing operation of said device to prevent the emitted radiation from said first radiation source from passing to said reproducing means and movable from said path during the viewing operation of said device to permit the emitted radiation from said first radiation source to pass to said viewing screen.

12. A device as recited in claim 11 wherein said reproducing means includes first means for initiating the movement of both said reflecting means and said shutter means from a first position to a second position and second means for initiating the movement of said reflecting means and said shutter means from said second position to said first position.

13. A device as recited in claim 12 wherein said first initiating means includes means for moving said shutter means from said first position to said second position prior to the movement of said reflecting means from said first position to said second position.

14. A device as recited in claim 12 wherein said second initiating means includes means for moving said reflecting means from said second position to said first position prior to the movement of said shutter means from said second position to said first position.

15. A micro-image viewing and reproduction device for selectively displaying a micro-image on a viewing screen or reproducing a micro-image on a light sensitive member, the combination comprising:

a supply of light sensitive copy material,
a viewing screen for receiving projected images of said micro-images,
an exposure plane for receiving a light sensitive copy sheet.
an optical system providing an optical path equipped with first and second radiant energy sources, said first source being continuously energized during the operation of said device, said energy sources being focused at a common location in said optical system,
a lens assembly positioned in said optical system to receive the radiant energy from said common focus location,
a first, movable, reflective surface having an operative state and a non-operative state for receiving radiation from said first radiation source for projection to said viewing screen when in said operative state and movable to a position outside said optical path when in said non-operative state,
control means associated with said first reflective surface,
a second fixed reflective surface in said optical path for directing radiation onto said exposure plane,
a shutter mechanism disposed between said first and second radiation sources operable between a closed and open position, a continuously operating conveyor for transporting said copy material along said exposure plane, means for automatically initiating the feed of said copy material to said exposure plane, first sensing means disposed in said exposure plane actuated by the leading edge of said copy material for operating said shutter mechanism to said closed condition and for energizing said control means to place said first reflective surface in its non-operating state, second sensing means in said exposure plane actuated by the leading edge of said copy material for energizing said second radiation source, for deenergizing said control means to place said first reflective surface in its operative state, and for returning said shutter to its open position.

16. A micro-image viewing and reproduction device operable between a viewing condition in which said micro-image is projected on said viewing screen and an imaging condition in which the micro-image is reproduced on a light sensitive material, the combination comprising:

a source supply of micro-images and drive means for transporting said micro-images through said device, a supply of light sensitive copy material, a viewing screen for receiving projected images of said micro-images, an exposure plane for receiving a light sensitive copy sheet, an optical assembly providing an optical path equipped with first and second radiant energy sources for emitting radiation along a common path, said second energy source including a reflector for converging and focusing the emitted radiation for said energy source at a point location and said second energy source being positioned at said point location, said first energy source being energized continuously during the time said micro-images are being transported through said device, said second energy source being energized momentarily for reproducing one of said micro-images on said light sensitive material, and shutter means for blocking the illumination from said first energy source when said copy material is in said exposure plane.

17. A viewing and reproduction device adapted to handle micro-image records, said micro-image records having recognizable indicia thereon, and operable between a viewing condition in which said micro-images are projected on a viewing screen and an imaging condition in which said micro-images are reproduced on light sensitive material, the combination comprising:

a feed supply of micro-image records, an optical assembly providing an optical path equipped with first and second radiant energy sources for emitting radiation along a common path, said first energy source including a reflector for converging and focusing the radiation at a predetermined focal point and said second radiation source being positioned at said predetermined focal point, a viewing screen for receiving a projected image in a predetermined location thereon of a micro-image positioned in said optical assembly, drive means for moving said micro-images relative to said optical assembly from said supply of micro-image records, optical sensor means positioned on said viewing screen in a predetermined location and adapted to recognize the projection of said indicia from said micro-image records, and control means responsive to said sensor means for operating said drive means to locate said micro-image relative to said optical assembly so that said projected image is in said predetermined location on said viewing screen.

* * * * *